April 20, 1965   C. W. FARROW   3,179,883
POINT MATRIX DISPLAY UNIT FOR TESTING LOGIC CIRCUIT
Filed Nov. 8, 1960   5 Sheets-Sheet 1
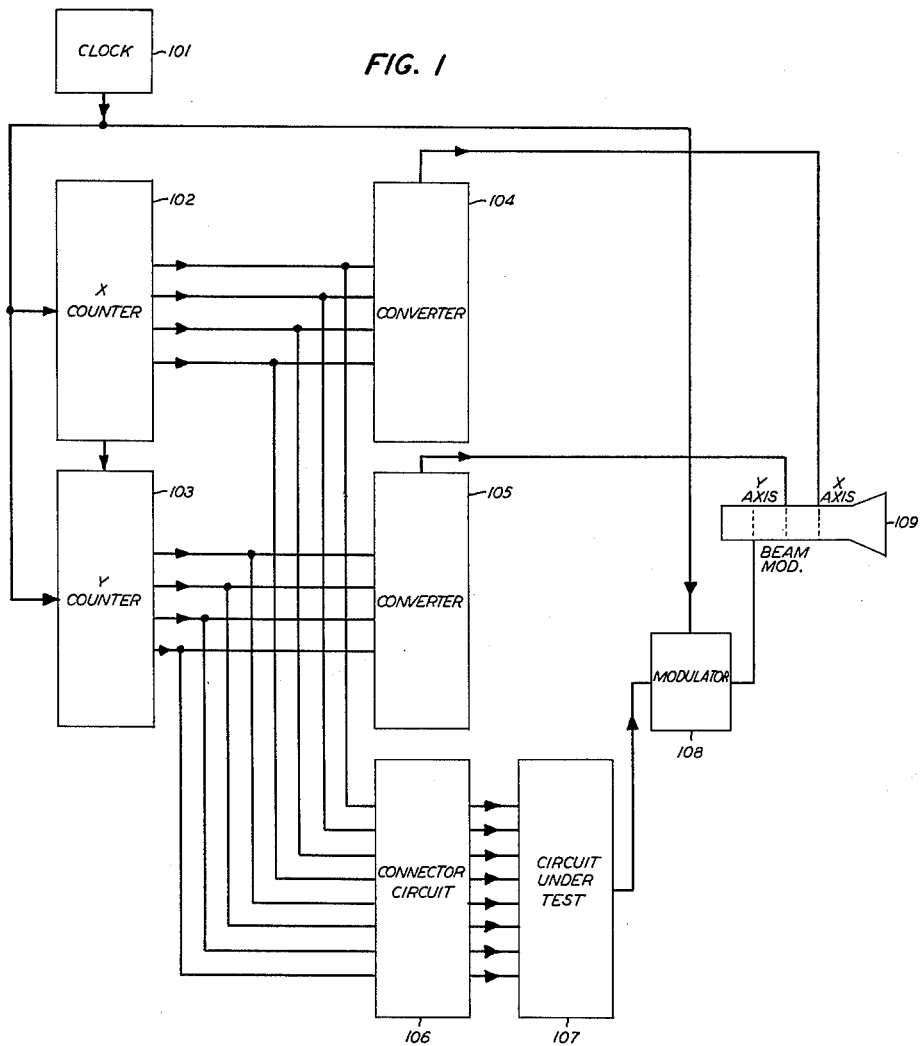
FIG. 1
FIG. 6
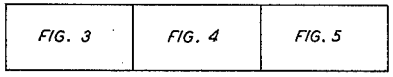
INVENTOR
C. W. FARROW
BY
R C Lipton
ATTORNEY April 20, 1965   C. W. FARROW   3,179,883
POINT MATRIX DISPLAY UNIT FOR TESTING LOGIC CIRCUIT
Filed Nov. 8, 1960   5 Sheets-Sheet 2

INVENTOR
C. W. FARROW
BY
ATTORNEY

INVENTOR
C. W. FARROW

April 20, 1965 C. W. FARROW 3,179,883
POINT MATRIX DISPLAY UNIT FOR TESTING LOGIC CIRCUIT
Filed Nov. 8, 1960 5 Sheets-Sheet 4

INVENTOR
C. W. FARROW
BY
R. C. Lipton
ATTORNEY

United States Patent Office 3,179,883
Patented Apr. 20, 1965

3,179,883
POINT MATRIX DISPLAY UNIT FOR
TESTING LOGIC CIRCUIT
Cecil W. Farrow, Coytesville, N.J., assignor to Bell Telephone Laboratories, Incorporated, New York, N.Y., a corporation of New York
Filed Nov. 8, 1960, Ser. No. 68,136
6 Claims. (Cl. 324—73)

This invention relates to display arrangements for data transmission systems and more particularly to arrangements for displaying the signal response of data translators and logical circuits.

In the testing and maintenance of data transmission systems, it is desirable to display the selective response of translation or logic circuits to signal combinations or permutations applied thereto. In previous arrangements for testing translation circuits, a code generator is utilized for applying to the circuit under test a predetermined pattern of digital code signals and the output signal response of the circuit under test is displayed on an oscilloscope screen. A source of synchronizing or clock pulses maintains the generation of the sequence of digital code signals in synchronism with the deflection of the beam whereby the condition of the beam on each incremental portion of the oscilloscope screen discloses the response of the tested circuit to each code combination.

It is a broad object of this invention to provide an improved arrangement for displaying the signal response of data translator and logical circuits.

It is another object of this invention to utilize digital code test signals applied to a circuit under test for selectively deflecting an oscilloscope beam.

It is a further object of this invention to provide a counting arrangement for generating a digital code test signal pattern which is simultaneously applied to a translator circuit and an oscilloscope beam deflection circuit.

A further object of this invention is to provide a display arrangement which requires fewer components than heretofore employed.

In accordance with a specific embodiment of the invention disclosed herein, a first and second multistage binary counter provides the digital code test pattern. The first counter is advanced by a clock pulse source to a predetermined count whereupon it is reset and the second counter is advanced one count. The advancing of the first counter is then resumed with the second counter advancing at the conclusion of each first count cycle until the second counter completes a cycle and both counters are reset. The condition of each stage of the counters is utilized to produce digital code signal permutations thus providing a number of signal combinations equal to the number of clock pulses required to complete a cycle of the second counter. A connecting or program circuit supplies input signals to the circuit under test in accordance with these signal combinations and the output response of the tested circuit is utilized to modulate an oscilloscope beam.

Associated with each counter is a digital-to-analog converter which generates a voltage step wave for each cycle of the associated counter, each step occurring in response to each advance of the counter. The step wave outputs of the converters associated with the first and second counters are applied to the horizontal and vertical deflecting plates, respectively, of the oscilloscope. This produces a rectangular array of dots on the oscilloscope screen wherein each dot is individual to a predetermined count. Since each code signal permutation is also individual to a predetermined count, the performance of the circuit under test can readily be determined by observing the condition of the beam at each dot position.

The means for fulfilling the foregoing objects and the practical embodiment of the features of this invention will be fully understood from the following description taken in conjunction with the accompanying drawings wherein:

FIG. 1 is a functional diagram of a display system in accordance with this invention;

Figure 2A:
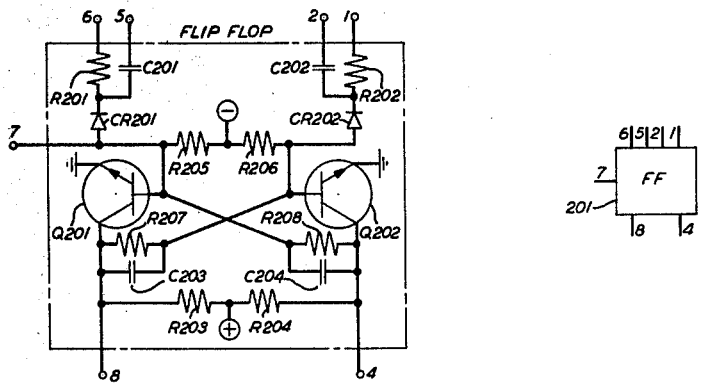
FIGS. 2A, 2B, 2C and 2D show details of circuit components suitable for use in the specific embodiment of this invention.

Referring now to FIG. 1, a source of clock pulses is symbolically shown as block 101. The clock pulses from source 101 are provided to the inputs of a four-stage binary counter 102, a four-stage binary counter 103 and modulator circuit 108. The output of each stage of counter 102 and counter 103 is extended to connector or program circuit 106, which either directly applies the counter output leads to the input terminals of the circuit under test, shown as block 107, or applies input conditions to the circuit under test in accordance with a program controlled by the counter stage outputs in a manner well known in the art.

The output lead of each stage of counter 102 also extends to converter 104. The output of converter 104 in turn extends to the horizontal deflecting plate of oscilloscope 109. The output lead of each stage of counter 103 also extends to converter 105. The output of converter 105 in turn extends to the vertical deflecting plate of oscilloscope 109. Modulator circuit 108 is controlled by the output signal response of circuit-under-test 107 and the output of modulator 108 extends to the beam modulating grid of oscilloscope 109. Accordingly, modulator 108, which is maintained in synchronism with counters 102 and 103 by clock 101, modulates the oscilloscope beam in accordance with the output signal of circuit 107.

Each of the clock pulses from source 101 advances counter 102 until counter 102 reaches a predetermined count. The next clock pulse then resets counter 102 and advances counter 103 one count. Counter 102 is again advanced by the subsequent clock pulses and reset after a complete count, advancing counter 103. Counter 103 is advanced after each cycling of counter 102 until counter 103 reaches a predetermined count whereupon both counters are reset.

The enabling of different ones of the stages of counter 102 while the counter is advancing provides voltage potentials on the output leads of the counter. Similarly, the advancing of counter 103 provides different voltage potentials on the output leads of the counter.

Converter 104 functions to convert the various output potentials provided by counter 102 to a voltage step wave. With counter 102 in the initial condition, the step wave is substantially at zero potential. With each advance of counter 102, the voltage potential at the output of converter 104 is incrementally increased until a maximum voltage potential is obtained on the final count of counter 102. Since the output of converter 104 is connected to the horizontal deflecting plate of oscilloscope 109, each advance of counter 102 incrementally increases the voltage applied to the horizontal deflecting plate whereby incremental horizontal steps of the beam are provided, corresponding to the counts of counter 102.

Converter 105 functions in a manner similar to converter 104 with the exception that when counter 103 is in the initial condition, a maximum voltage potential is supplied to the output of converter 105. Each subsequent advance of counter 103 incrementally reduces this voltage potential. Since the output of converter 105 extends to the vertical deflecting plate of oscilloscope 109, each advance of counter 103 incrementally steps the oscilloscope beam in a vertical direction starting from a maximum vertical deflection.

Since counter 103 is advanced one step for each cycle of counter 102, it is apparent that a rectangular array of dots is provided on the oscilloscope screen wherein the number of dots in each horizontal row is equal to the count of counter 102 and the number of columns of dots is equal to the count of counter 103.

As previously described, the advance of each of counters 102 and 103 provides different voltage potentials on the counter output leads and these permutations of voltage potentials are applied by way of connector circuit 106 to control the input conditions of circuit 107. Accordingly, each of the signal permutations is associated with an individual one of the dots in the oscilloscope array. Since the beam is modulated in accordance with the response of circuit 107 to each signal permutation, the performance of circuit 107 can be determined by observing the associated dot position in the array.

FIGS. 2A, 2B, 2C and 2D disclose circuit details of certain components which are suitable for use in the present invention. FIG. 2A shows a flip-flop or bistable circuit which includes transistors Q201 and Q202. Input terminals to the flip-flop circuit are designated terminals 1, 2, 5, 6 and 7. The output terminals are designated 4 and 8. The flip-flop is arranged so that one transistor is in the conducting state and the other transistor is nonconducting. The state wherein transistor Q202 is conducting and transistor Q201 is nonconducting is hereinafter referred to as the reset state. The converse condition wherein transistor Q201 is conducting and transistor Q202 is nonconducting is hereinafter referred to as the set state.

Input driving pulses to the flip-flop are applied to terminals 2, 5 or 7. The driving pulses applied to terminals 2 and 5 comprise negative transitions or ground pulses. In the event that input terminal 1, for example, has a ground potential applied thereto, varistor CR202 is forward-biased whereby a negative-going or ground pulse applied to terminal 2 is passed by way of capacitor C202 and varistor CR202 to the base of transistor Q202. In the event, however, that a positive potential is applied to terminal 1 and thus to varistor CR202 by way of resistor R202, varistor CR202 is reverse-biased and the pulse applied to terminal 2 is blocked by varistor CR202. Similarly, driving pulses applied to terminal 5 are passed by way of capacitor C201 and varistor CR201 to the base of transistor Q201 in the event that ground is applied to terminal 6. With a positive potential applied to terminal 6, the driving pulses on terminal 5 are blocked by varistor CR201. Negative-driving pulses on terminal 7 are applied directly to the base of transistor Q201.

Assuming now that the flip-flop is in the reset condition wherein transistor Q202 is conducting and transistor Q201 is nonconducting, ground is applied to output terminal 4 by way of the emitter-collector path of transistor Q202 and positive potential is applied to terminal 8 by way of resistor R203. A driving pulse now applied to terminal 2 transfers the flip-flop to the set state. This pulse is passed to the base of transistor Q202 rendering transistor Q202 nonconducting. The resultant positive potential applied to the collector of transistor Q202 by way of resistor R204 is also applied to the base of transistor Q201 by way of capacitor C204, turning on transistor Q201. With transistor Q201 conducting, its collector, and consequently terminal 8, is at ground. The collector ground applied by way of resistor R207 to the base of transistor Q202 maintains transistor Q202 nonconducting. The circuit is thus maintained in the set state wherein terminal 8 has ground applied thereto and terminal 4 has a positive potential applied thereto.

The circuit is reset by a pulse applied to terminal 7 or 5 which turns transistor Q201 off. The resultant positive transition of the collector of transistor Q201 is applied by way of capacitor C203 to the base of transistor Q202 rendering it conductive. The flip-flop is thus restored to the original reset state.

Flip-flop 201 designates in block form the flip-flop circuit just described. Terminals 1, 2, 4, 5, 6, 7 and 8 correspond to the previously-described and similarly numbered terminals.

Figure 2B:

FIG. 2B shows an enabling gate which functions to pass negative pulses in the event that an enabling voltage is applied to terminal $e$. Assuming that terminal $e$ is at ground potential, varistor CR210 is forward-biased and a pulse applied to capacitor C210 is gated by way of varistor CR210. In the event, however, that a positive potential is applied to terminal $e$, negative ground pulses applied to capacitor C210 are blocked by varistor CR210. The gate is symbolically shown by block 210 and includes the previously-described terminal $e$.

Figure 2C:
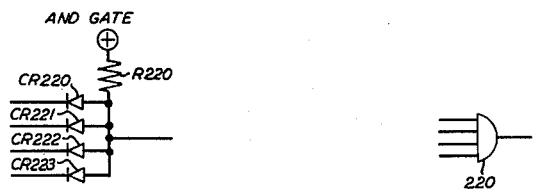

FIG. 2C shows an AND gate which functions to provide a positive potential at its output in the event that all of the inputs are positive. In the event, however, that ground or negative potential is applied to one or more of varistors CR220 through CR223, this ground potential is applied to the common output lead of the varistors. The AND gate is symbolically shown by block 220.

Figure 2D:
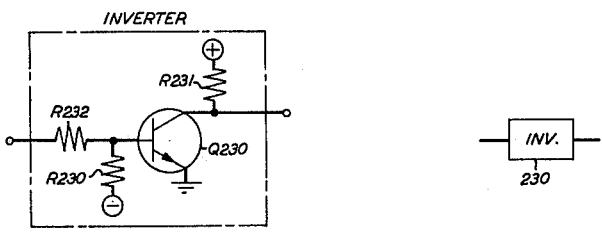

FIG. 2D shows an inverter circuit which functions to provide a positive output potential when ground is applied thereto and an output ground potential when a positive potential is applied thereto. Assuming ground is applied to resistor R232, the base of transistor Q230 is negatively biased by way of resistor R230. This renders transistor Q230 nonconducting and provides a positive output potential by way of resistor R231. In the event that a positive potential is applied to resistor R232, transistor Q230 is rendered conductive applying ground to its collector; the inverter circuit is symbolically shown by block 230.

Figure 3:
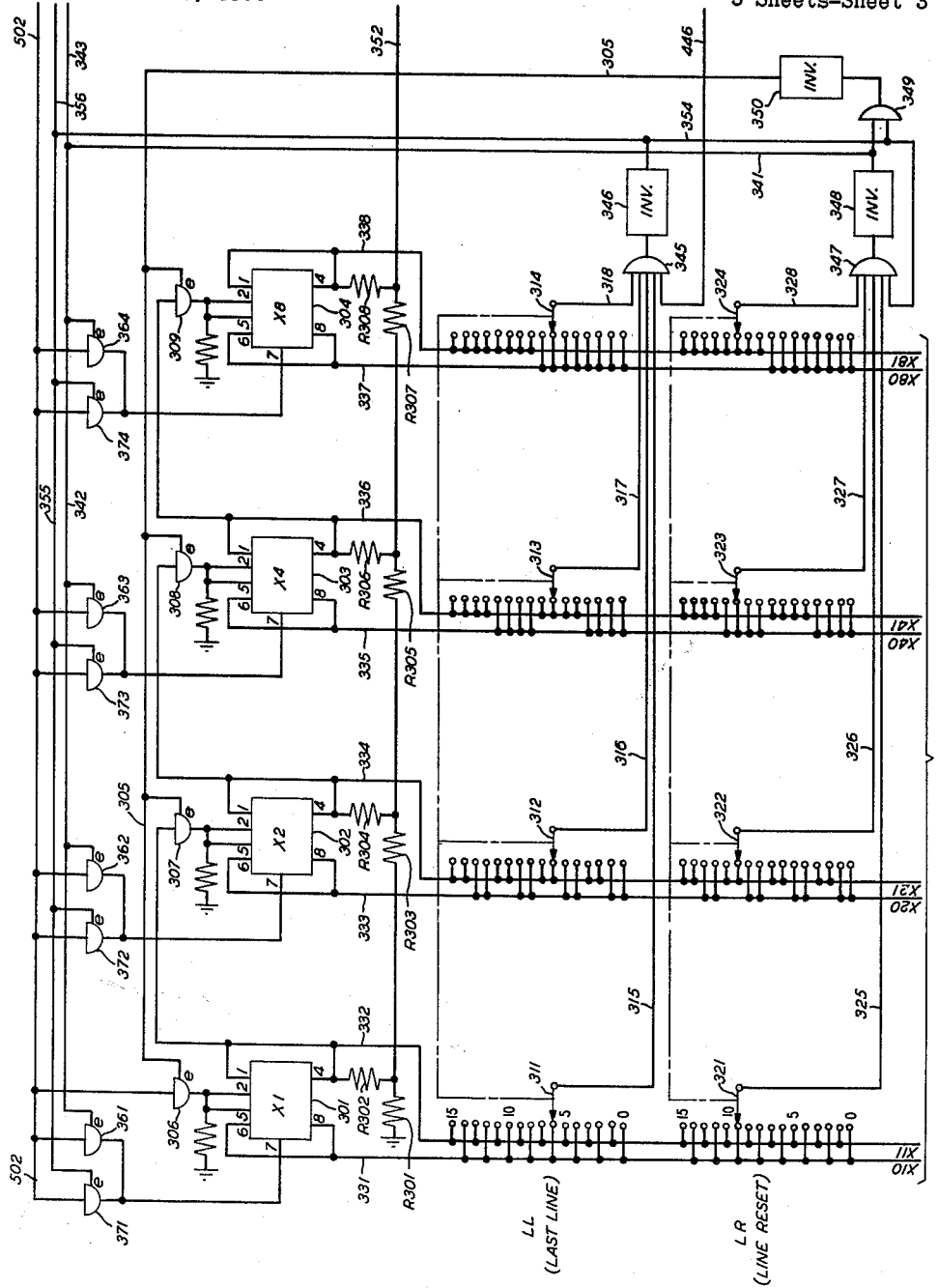
FIGS. 3 through 5, when arranged as shown in FIG. 6, show the manner in which the circuits and equipments cooperate to form a display system in accordance with this invention.
Figure 4:
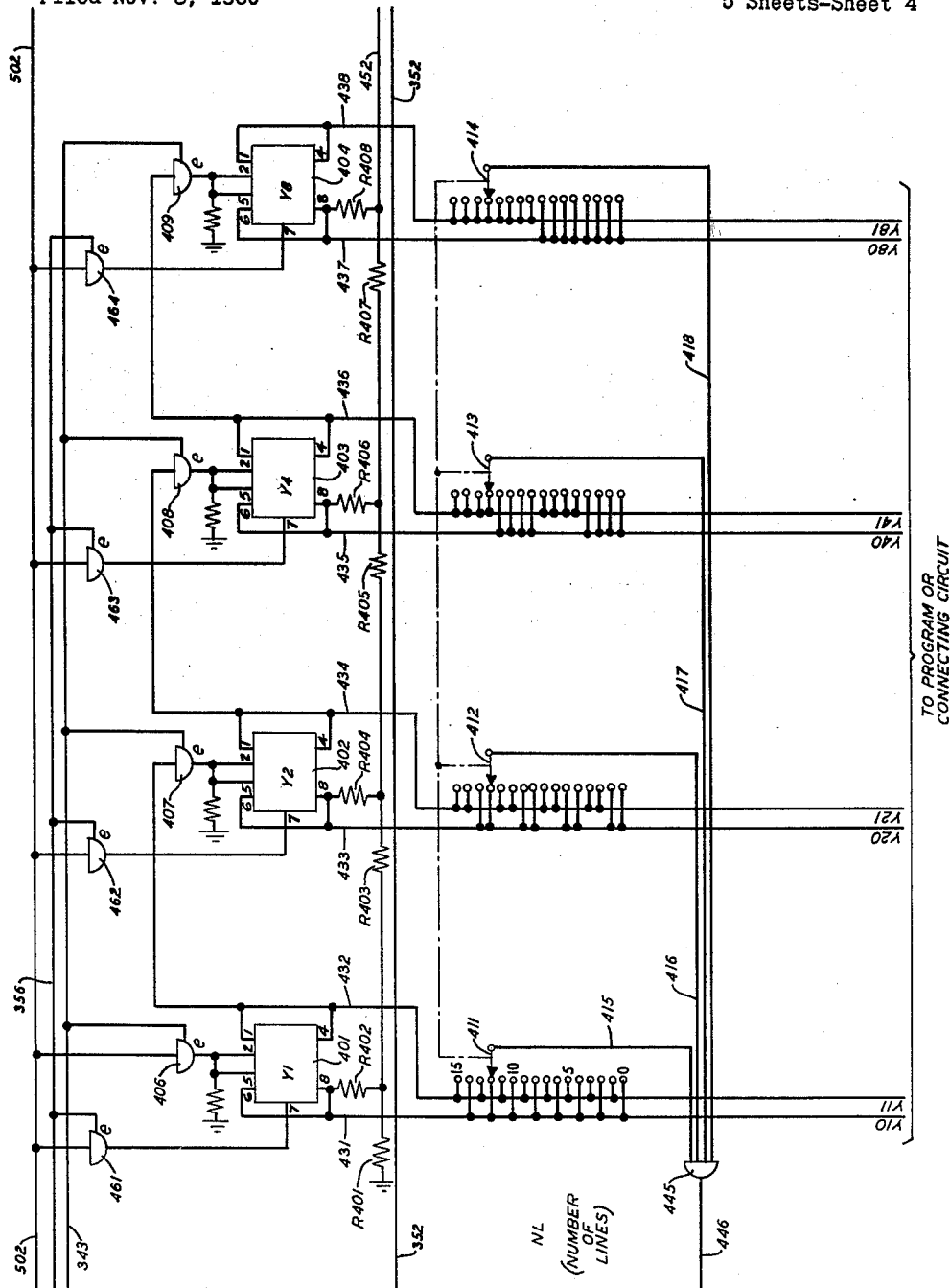
Figure 5:
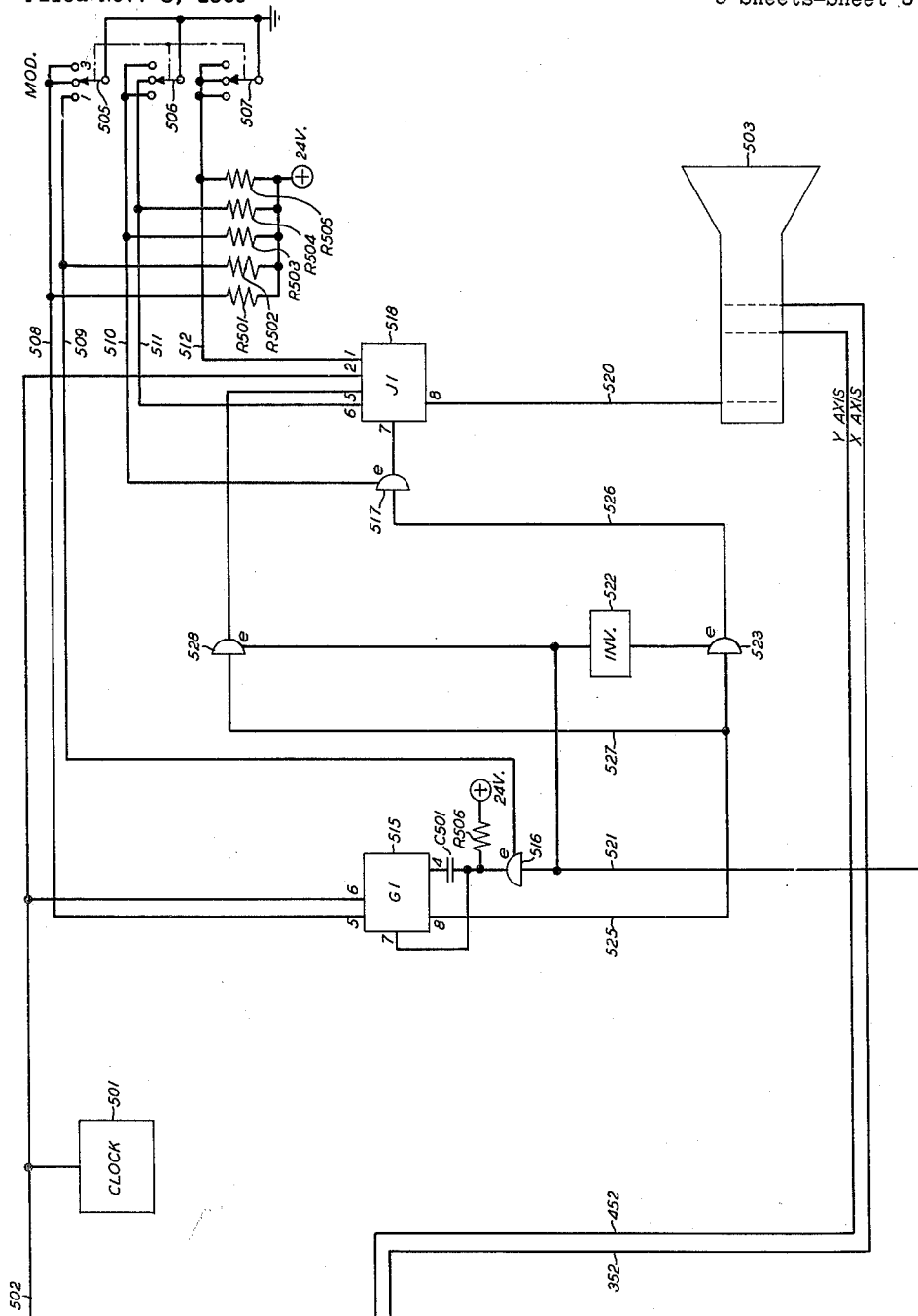

Referring now to FIGS. 3, 4 and 5 and more particularly to FIG. 3, flip-flops 301, 302, 303 and 304 are arranged to function as a binary counter, hereinafter referred to as the X counter. Output terminal 4 of each of the flip-flops is connected to input terminal 1 and output terminal 8 is connected to input terminal 6. Accordingly, when flip-flop 301, for example, is in the reset state, the ground potential on terminal 4 is applied to terminal 1 whereby a negative pulse applied to terminal 2 sets flip-flop 301. Similarly, when flip-flop 301 is in the set state, the ground potential on terminal 8 enables a negative pulse applied to terminal 5 to reset the flip-flop.

Negative clock pulses for driving the X counter are provided by a conventional source of clock pulses symbolically shown as block 501, FIG. 5. These clock pulses are applied to the input of enabling gate 306 by way of lead 502.

Assuming now that lead 305 is at ground potential, enabling gates 306, 307, 308 and 309 are closed, permitting pulses to pass therethrough.

In the initial or zero condition, each of the flip-flops in the X counter is in the reset state. The first clock pulse is therefore applied via gate 306 and terminal 2 of flip-flop 301, setting the flip-flop. The next clock pulse is applied by way of gate 306 and terminal 5 to reset the flip-flop. The resetting of flip-flop 301 restores ground to terminal 4 and a negative voltage transition is applied by way of lead 332 and enabling gate 307 to terminal 2 of flip-flop 302 thereby setting flip-flop 302. Accordingly, the first clock pulse sets flip-flop 301 and the second clock pulse resets flip-flop 301 and sets flip-flop 302. Similarly, the third clock pulse sets flip-flop 301 and the fourth clock pulse resets flip-flop 301, resets flip-flop 302 and sets flip-flop 303 in substantially the same manner as previously described or flip-flop 302. Accordingly, flip-flops 301 through 304 provide a binary count of 16 clock pulses in a manner well known in the art.

Terminal 4 of each of the flip-flops of the X counter is connected to a resistive ladder network which comprises an arrangement for converting the digital counter signals to analog voltages. This resistive network comprises resistors R301 through R308 and the resultant voltages are applied to lead 352 which extends to the horizontal deflecting grid of an oscilloscope symbolically shown as block 503.

With the counter in the initial condition, terminal 4 of each of the flip-flops is at ground potential and lead 352 is, therefore, also at ground potential. The first clock pulse sets flip-flop 301, as previously described, whereby terminal 4 of flip-flop 301 is at a positive potential and terminal 4 of each of the other flip-flops is at ground potential. The positive voltage condition on terminal 4 is applied to the junction of resistors R301 and R302 which resistors comprise the first step of the ladder network. The potential at the junction of resistors R301 and R302 is applied in turn to lead 352 by way of the three subsequent steps of the ladder network. The resistances of the ladder network are arranged so that the voltage on lead 352 is $1/16$ the voltage on terminal 4 when flip-flop 301 is in the set state.

The second clock pulse sets flip-flop 302 and resets flip-flop 301 whereby a positive potential is applied to terminal 4 of flip-flop 302 and ground is applied to terminal 4 of each of the other flip-flops. The positive voltage condition on terminal 4 of flip-flop 302 is applied to the junction of resistors R303 and R304, comprising the second step of the ladder network, and in turn to lead 352 by way of the two subsequent steps of the ladder network whereby the voltage on lead 352 is $2/16$ the voltage on terminal 4. Similarly, each succeeding advance of the binary counter incrementally increases the voltage on lead 352 by $1/16$ the voltage on terminal 4 whereby a number of incremental horizontal steps of the beam is provided corresponding to the counts of the X counter. With all the stages of the X counter in the set state, designating a count of 15, the potential on lead 352 is $15/16$ the terminal 4 voltage.

Terminal 8 of each of flip-flops 301, 302, 303 and 304 extends to leads 331, 333, 335 and 337, respectively. Terminal 4 of each of the flip-flops 301, 302, 303 and 304 extends to leads 332, 334, 336 and 338, respectively. Leads 331 and 332 comprise a pair of leads which extend to a program or connecting circuit, not shown. As previously described, one or both of these leads may be connected to the input terminals of the circuit under test or to a program circuit applying signals to the circuit under test in accordance with the advance of the counter. Similarly, either one or both of the pairs of output leads extending from each of the other flip-flops may be connected to the program or connecting circuit. It is thus seen that a different permutation of signals are supplied by the X counter for each advance of the counter in response to the clock pulses.

Leads 331 and 332 are also strapped to the terminals of the first bank of a mechanically-operated last-line switch and the terminals of the first bank of a mechanically-operated line-reset switch. Similarly, the output pairs of leads of flip-flops 302, 303 and 304 are strapped to the second, third and fourth banks, respectively, of the last-line switch and the line-reset switch. The function of these switches are described subsequently.

Referring now to FIG. 4, flip-flops 401, 402, 403 and 404 are arranged in a binary counter circuit, hereinafter referred to as the Y counter, similar to the X counter circuit shown in FIG. 3. Assuming lead 343 is at ground potential, enabling gates 406, 407, 408 and 409 are closed permitting the gating of pulses therethrough. The output terminal 4 of each flip-flop is connected to input terminal 1 and the output terminal 8 is connected to input terminal 6 in the same manner as previously described for the X counter.

In the initial condition each of the flip-flops of the Y counter are in the reset state. The first clock pulse on lead 502 is passed by way of gate 406 to terminal 2 of flip-flop 401, setting flip-flop 401. The second clock pulse is applied by way of gate 406 to terminal 5, resetting flip-flop 40. This restores ground to output terminal 4 and the negative transition is applied by way of gate 407 to terminal 2 of flip-flop 402, setting flip-flop 402. Accordingly, with lead 343 at ground potential, the binary counter comprising flip-flops 401 through 404 is advanced by the clock pulses in substantially the same manner as the X counter.

Terminal 8 of each of flip-flops 401 through 404 is connected to a resistive ladder network comprising resistors R401 through R408. This network is substantially identical to the previously-described ladder network comprising resistors R301 through R308. In the same manner as previously described for the ladder network of FIG. 3, each advance of the binary counter of FIG. 4 incrementally changes the voltage applied to lead 452. It is noted, however, that the network is attached to each of terminals 8 of the Y counter flip-flops rather than to terminals 4. Accordingly, in the initial condition when the Y counter flip-flops are all reset, a voltage potential equal to $15/16$ of the terminal 8 voltage is applied to lead 452 and each advance of the counter incrementally reduces this voltage potential by $1/16$ of the terminal 8 voltage. Lead 452 extends to the vertical deflecting plate of oscilloscope 503. Accordingly, each advance of the Y binary counter incrementally steps the beam in a vertical direction starting from a maximum vertical deflection.

Since each advance of the X binary counter horizontally steps the oscilloscope beam and each advance of the Y binary counter vertically steps the oscilloscope beam, it is apparent that if the Y binary counter advances one step for each 16 steps of the X binary counter, a rectangular array of dots is provided on the oscilloscope screen having 16 rows and 16 columns.

Output terminal 8 and output terminal 4 of flip-flop 401 are connected to leads 431 and 432, respectively, which comprise a pair of leads extended to the program or connecting circuit, not shown. As previously described, one or both of these leads may be connected to the program or connecting circuit. Similarly, either one or both of the output leads of each of the other flip-flops 402 through 404 may extend to the program or connecting circuit. Accordingly, assuming each counter provides a full count of 16, 256 different permutations of signals are provided over 8 or 16 parallel leads to the program or connecting circuit and each signal permutation corresponds or is associated with an individual dot position on the oscilloscope screen.

The number of dots in each horizontal line in the oscilloscope pattern is determined by the manually-operated line-reset switch shown in FIG. 3. The number of horizontal lines in the dot pattern is controlled by the switch setting of manually-operated number-of-lines switch shown in FIG. 4. The number of dots in the last horizontal line is determined by the switch setting of manually-operated last-line switch shown in FIG. 3.

Output terminals 8 and 4 of flip-flop 301 are strapped to the terminals of the first bank of the line-reset switch which bank is associated with wiper 321. Similarly, the output terminals of flip-flops 302, 303 and 304 of the X counter are strapped to the terminals of the second, third and fourth banks of the line-reset switch which are associated with wipers 322, 323 and 324, respectively. The output terminals of the X counter flip-flops are similarly strapped to the terminals of the four banks of the last-line switch which banks are associated with wipers 311, 312, 313 and 314, respectively. The output terminals of the flip-flops of the Y counter are similarly strapped to the terminals of the four banks of the number-of-lines switch which banks are associated with wipers 411, 412, 413 and 414, respectively. It is assumed in the following description that the wipers of the line-reset switch have been operated to terminals 10, the wipers of the last-line switch have been operated to terminals 6, and the wipers of the number-of-lines switch have been operated to terminals 12, as shown in FIGS. 3 and 4.

With the wipers of the line-reset switch operated to terminals 10 and the X counter in the initial or zero count condition, it is noted that output terminal 4 of flip-flop 302 is at ground potential applying ground by way of lead 334 and wiper 322 to lead 326. During each count of the X counter at least one of leads 325, 326, 327 or 328, which leads are connected to wipers 321, 322, 323 and 324, respectively, is at ground potential except when the X counter has been advanced to the tenth count by the clock pulses. Similarly, during each count of the X counter at least one of leads 315, 316, 317 or 318, which leads are connected to wipers 311, 312, 313 and 314, respectively, has ground applied thereto except when the X counter has advanced to the sixth count. It is also apparent that at least one of leads 415, 416, 417 or 418, which leads are associated with wipers 411, 412, 413 and 414, respectively, has ground applied thereto except when the Y counter has advanced to the 12th count.

Leads 325 through 328, together with lead 354, are applied to the input of AND gate 347. Since during the first nine counts of the X counter at least one of leads 325 through 328 has ground applied thereto, gate 347 applies ground to inverter 348 which in turn applies a positive potential to lead 341 and to one input of AND gate 349. The positive potential on lead 341 is extended by way of lead 342 to the enabling terminals of enabling gates 361, 362, 363 and 364, maintaining these gates disabled. The positive potential on lead 341 is also extended by way of lead 343 to the enabling terminals of enabling gates 406, 407, 408 and 409, FIG. 4, maintaining these gates disabled.

Leads 415 through 418 extend to the input of AND gate 445. Since at least one of these leads has ground applied thereto during the first 11 counts of the Y counter, output lead 446 of AND gate 445 is maintained at ground potential. Leads 315 through 318, together with lead 446, are extended to the input of AND gate 345. Since lead 446 is maintained at ground potential with the exception previously noted and at least one of leads 315 through 318 is maintained at ground potential for each count of the X counter with the exception of the sixth count, AND gate 345 applies ground to inverter 346 which in turn applies a positive potential to lead 354. The positive potential on lead 354 is extended to the other input of AND gate 349 and the input of AND gate 347. In addition, the positive potential on lead 354 is extended by way of lead 355 to the enabling terminals of enabling gates 371, 372, 373 and 374, disabling the gates. The positive potential on lead 354 is also extended by way of lead 356 to the enabling terminals of enabling gates 461, 462, 463 and 464, FIG. 4, disabling these gates.

The positive potentials applied to the two input leads of AND gate 349, as previously described, provide a positive output potential for AND gate 349. This positive potential is applied to inverter 350 which in turn applies ground to lead 305. As previously described, the ground potential on lead 305 enables gates 306 through 309 whereby the X counter is advanced by the clock pulses.

When the X counter count advances to ten, each of leads 325 through 328 is in a positive condition. In addition, lead 354 is in a positive condition as previously described. Accordingly, gate 347 applies a positive voltage to inverter 348 which in turn applies ground to lead 341 and to the input to gate 349. Gate 349 in turn applies ground to inverter 350 which in turn applies a positive potential to lead 305. The positive potential on lead 305 disables gates 306 through 309 whereby the X counter is not advanced by the next clock pulse.

Returning now to the ground potential applied to lead 341, this ground potential is extended to lead 342, enabling gates 361 through 364. The next clock pulse applies to lead 502 therefore passes through gates 361 through 364 to terminal 7 of flip-flops 301 through 304 whereby the X counter flip-flop stages are reset, restoring the X counter to the initial condition.

The ground potential on lead 341 is also extended to lead 343 enabling gates 406 through 409. Since gates 406 through 409 are enabled, the next clock pulse on lead 502 advances the Y counter as previously described. The resetting of the X counter reapplies ground to lead 305 and the X counter again proceeds to advance in the same manner as previously described. Accordingly, the X counter advances from zero count to the tenth count providing 11 dots for each horizontal line on the oscilloscope screen. Then on the next succeeding clock pulse the X counter resets and the Y counter advances one count. This process continues from the zero count of the Y counter to the 11th count.

When the Y counter advances to the 12th count, each of leads 415 through 418 is rendered positive whereby gate 445 applies a positive potential to lead 446. When the X count advances to the sixth count, leads 315 through 318 are rendered positive. Accordingly, when the X counter advances to the sixth count during its 13th cycling, i.e. during the period when the Y counter is in the 12th count, all the input leads to gate 345 are in the positive condition and the output of gate 345 applies a positive potential to inverter 346. Inverter 346 in turn applies a ground potential to lead 354. This ground, which extends to the inputs of gates 347 and 349, renders leads 341 and 305 positive, precluding the advancing of the X and Y counters as previously described.

The ground potential on lead 354 is also applied by way of lead 355 to the enabling terminals of gates 371, 372, 373 and 374. Accordingly, the next clock pulse is gated through gates 371 through 374 to terminal 7 of flip-flops 301 through 304 whereby the X counter is reset. The ground potential on lead 354 is also applied by way of lead 356 to the enabling terminals of gates 461, 462, 463 and 464. Thus the next succeeding clock pulse is gated through gates 461 through 464 to reset the flip-flops in the Y counter.

This completes the cycling of the X and Y counters and the next clock pulse will reinstitute the cycling and prepare a new dot pattern on the oscilloscope screen.

The circuit shown in FIG. 5 provides modulation of the oscilloscope beam in accordance with the output signal of the circuit under test. Three well-known types of output signaling may be provided by the tested circuit. A first type consists of a normally positive output signal with one or more negative or ground pulses or spikes as selectively determined by the input signals applied thereto. A second type comprises a normally positive output signal which is selectively rendered negative in response to a first predetermined permutation of signals applied thereto and restored to positive in response to a second permutation of signals. A third type comprises a normally negative or ground signal output which is rendered positive in response to a first predetermined permutation signal combination and restored to ground in response to a second signal permutation. The modulator switch shown in FIG. 5 arranges the circuit for detecting the above-mentioned three types of signaling in accordance with the setting of wipers 505, 506 and 507 to terminals 1, 2 or 3.

Wipers 505 through 507 of the modulator switch are set to terminal 1 for circuits which provide negative pulses or spikes. With wiper 505 set to terminal 1, a positive potential is applied by way of resistor R501 and lead 508 to terminal 5 of flip-flop 515 thereby blocking pulses applied to terminal 6. In addition, ground is applied by way of wiper 505 and lead 509 to the enabling terminal of gate 516 whereby gate 516 is enabled to pass pulses therethrough. The setting of wiper 506 to terminal 1 applies ground to lead 510 enabling gate 517. With wiper 506 on terminal 1, the application of a positive potential by way of resistor R504 and lead 511 to terminal 6 of flip-flop 518 blocks the application of pulses to terminal 5. The setting of wiper 507 to terminal 1 applies ground by way of lead 512 to input terminal 1 of flip-flop 518 permitting the application of pulses to the flip-flop by way of input terminal 2.

Flip-flop 515 is normally maintained in the set condition due to positive voltage applied by way of resistor R506 to terminal 7. When the flip-flop is reset as described hereinafter, the negative transition at terminal 4 is applied to the junction of terminal 7 and resistor R506 by way of capacitor C501. This negative potential is discharged by capacitor C501, however, by way of resistor R506 whereby flip-flop 515 is restored to the set condition. It is thus seen that capacitor C501, resistor R506 and the positive potential applied thereto renders flip-flop 515 monostable. The capacitance of capacitor C501 and the resistance of resistor R506 are arranged so that the delay in restoring flip-flop 515 to the set state is small compared to the interval between clock pulses.

Each clock pulse from lead 502 is applied to terminal 2 of flip-flop 518 whereby flip-flop 518 is placed in the set condition. In the set condition terminal 8 of flip-flop 518 is at ground potential and this ground is applied via lead 520 to the beam modulating grid of oscilloscope 503. Accordingly, the beam is cut off when flip-flop 518 is in the set condition.

The output signal from the circuit under test is applied to lead 521. If no signal spikes are received from the circuit under test, flip-flop 518 remains in the set condition and the oscilloscope beam is maintained cut off.

Assuming now that in response to a permutation of signals applied from the X and Y counters to the circuit under test by way of the programing or connecting circuit, a negative spike is applied to lead 521. This spike is then gated by way of gate 516 to terminal 7 of flip-flop 515, resetting the flip-flop. When flip-flop 515 restores to the set condition, as previously described, the negative transition on terminal 8 is applied to gate 523 by way of lead 525. Recalling now that lead 521 is normally in the positive condition except for the negative signal spikes, this positive potential is applied to inverter 522 which in turn applies ground to the enabling terminal of gate 523. Accordingly, since the signal spike terminates prior to the restoration of flip-flop 515, the negative transition on lead 525 is gated through gate 523 to lead 526 and then by way of gate 517 to terminal 7 of flip-flop 518, resetting flip-flop 518. The resetting of flip-flop 518 renders terminal 8 positive whereupon the oscilloscope beam is turned on. The next clock pulse then resets flip-flop 518, as previously described, turning off the oscilloscope beam.

In order to detect a signal, which is normally positive, rendered negative in response to a first signal permutation and restored to positive in response to a second signal permutation, wipers 505 through 507 are set to terminals 2. The setting of wiper 505 to terminal 2 applies ground to terminal 5 of flip-flop 515 by way of lead 508 whereupon pulses may be applied to flip-flop 515 by way of terminal 6. Positive potential is now applied by way of resistor R502 and lead 509 to the enabling terminal of gate 516, disabling the gate. The setting of wiper 506 to terminal 2 provides ground to terminal 6 of flip-flop 518 by way of lead 511, enabling the application of pulses to flip-flop 518 by way of terminal 5. Positive potential is applied by way of resistor R503 and lead 510 to the enabling terminal of gate 517 whereby the gate is disabled. The setting of wiper 507 to terminal 2 applies ground to terminal 1 of flip-flop 518, enabling the application of pulses to the flip-flop by way of terminal 2.

As previously described, each clock pulse sets flip-flop 518 or maintains it in the set condition whereby the beam is cut off. In addition, the clock pulses are applied to terminal 6 of flip-flop 516, resetting the flip-flop. When flip-flop 515 restores to the set condition, a negative pulse is applied from terminal 8 to gate 528 by way of leads 525 and 527. It is recalled that the signal on lead 521 is normally positive. This positive potential is applied to the enabling terminal of gate 528 and the gate blocks the pulses applied to lead 527.

When signal lead 521 goes negative, gate 528 is enabled permitting the passage of the clock pulses, delayed by flip-flop 515, to terminal 5 of flip-flop 518. The delayed clock pulse, provided by way of flip-flop 515 and gate 528, resets flip-flop 518 to turn on the beam. The next clock pulse directly applied to terminal 2 of flip-flop 518 again sets flip-flop 518 to turn off the beam. Accordingly, the beam is turned on in the interval between each clock pulse until signal lead 521 is restored to a positive condition, disabling gate 528, whereupon flip-flop 518 is maintained in the set condition and the beam is maintained off.

To detect a signal, which is normally grounded, rendered positive in response to a first signal permutation and restored to ground in response to a second signal permutation, wipers 505 through 507 of the modulator switch are operated to terminals 3. The setting of wiper 505 on terminal 3 enables the application of pulses to terminal 6 of flip-flop 515 and disables gate 516 as previously described. The setting of wiper 506 on terminal 3 enables gate 517 and precludes the application of pulses to flip-flop 518 by way of terminal 5 as previously described. The setting of wiper 507 on terminal 3 enables the application of clock pulses to flip-flop 518 by way of terminal 2 as previously described.

The application of clock pulses to terminal 2 of flip-flop 518 sets the flip-flop to maintain the beam off. In addition, delayed clock pulses are applied by way of flip-flop 515 to lead 525 as previously described and thence to the input of gate 523. With signal lead 521 at ground potential, inverter 522 applies a positive potential to the enabling terminal of gate 523 whereby the pulses on lead 525 are blocked. When the potential on signal lead 521 is rendered positive, inverter 522 applies a ground potential to gate 523, enabling the gating of pulses therethrough to terminal 7 of flip-flop 518 by way of lead 526 and gate 517. This resets flip-flop 518, turning on the oscilloscope beam. Accordingly, with signal lead 521 at a positive potential, each delayed clock pulse applied by way of flip-flop 515 and gates 523 and 517 through terminal 7 of flip-flop 518 turns the beam on and each succeeding clock pulse directly applied to terminal 2 of flip-flop 518 cuts off the beam whereby the beam is turned on during the interval between the clock pulses. The restoration of ground potential on lead 521 disables gate 523 and flip-flop 518 is maintained in the set condition and the oscilloscope beam is maintained off.

Although a specific embodiment of the invention has been shown and described, it will be understood that various modifications may be made without departing from the spirit of this invention and within the scope of the appended claims.

What is claimed is:

1. In a device for displaying the output signal condition of translation circuits having a plurality of input terminals, an electron beam tube, means responsive to said translation circuit output signal for modulating the intensity of said electron beam, a digital code signal generator for generating patterns of signal permutations, means for applying said generated patterns of signal permutations to said plurality of input terminals, and deflecting means responsive to each of said generated signal permutations for selectively deflecting said electron beam.

2. In a device for displaying the output signal condition of translation circuits which have a plurality of input terminals, a tube having an electron beam, means responsive to said translation circuit output signal for modulating the intensity of said electron beam, a multistage binary counter, a counter output lead for each of said stages of said counter, step wave generating means connected to said counter output leads for deflecting said electron beam in accordance with each advance of said counter, and means for connecting each of said counter output leads to corresponding ones of said plurality of input terminals.

3. In a device for displaying the output signal condition of translation circuits which selectively provide an output signal in response to the application of patterns of input signal conditions, an electron beam tube, means responsive to said translation circuit output signal for modulating the intensity of said electron beam, a source of clock pulses, a first and second multistage binary counter, a counter output lead for each of said stages of said first and second counters, means responsive to said clock pulses for advancing said first and second counter, first step wave generating means connected to said counter output leads of said first counter for horizontally deflecting said electron beam in accordance with each advance of said first counter, second step wave generating means connected to said counter output leads of said second counter for vertically deflecting said electron beam in accordance with each advance of said second counter, and means connected to said counter output leads of said first and second counters for applying predetermined patterns of said input conditions to said translation circuit in accordance with each advance of said first and second counters.

4. In a device for displaying the output signal condition of translation circuits which selectively provide an output signal in response to the application of patterns of input signal conditions, an electron beam tube, means responsive to said translation circuit output signal for modulating the intensity of said electron beam, a source of clock pulses, a first and second multistage binary counter, a counter output lead for each of said stages of said first and second counters, means responsive to said clock pulses for advancing said first counter, means connected to said counter output leads of said first counter and responsive to the advance of said first counter to a predetermined count for resetting said first counter and advancing said second counter, first step wave generating means connected to said counter output leads of said first counter for horizontally deflecting said electron beam in accordance with each advance of said first counter, second step wave generating means connected to said counter output leads of said second counter for vertically deflecting said electron beam in accordance with each advance of said second counter, and means connected to said counter output leads of said first and second counters for applying predetermined patterns of said input conditions to said translation circuit in accordance with each advance of said first and second counters.

5. In a device for displaying the output signal condition of translation circuits which selectively provide an output signal in response to the application of patterns of input signal conditions, a tube having an electron beam, a source of clock pulses, means jointly responsive to each of said clock pulses and said translation circuit output signal for enabling said electron beam, a first and second multistage binary counter, a counter output lead for each of said stages of said first and second counters, means responsive to said clock pulses for advancing said first counter, means connected to said counter output leads of said first counter and responsive to the advance of said first counter to a predetermined count for resetting said first counter and advancing said second counter, first step wave generating means connected to said counter output leads of said first counter for horizontally deflecting said electron beam in accordance with each advance of said first counter, second step wave generating means connected to said counter output leads of said second counter for vertically deflecting said electron beam in accordance with each advance of said second counter, and means connected to said counter output leads of said first and second counters for applying predetermined patterns of said input conditions of said translation circuit in accordance with each advance of said first and second counters.

6. In a device for displaying the output signal condition of translation circuits which have a plurality of input terminals, a tube having an electron beam, a source of clock pulses, means jointly responsive to each of said clock pulses and said translation circuit output signal for enabling said electron beam, a first and second multistage binary counter, a counter output lead for each of said stages of said first and second counters, means responsive to said clock pulses for advancing said first counter, means connected to said counter output leads of said first counter and responsive to the advance of said first counter to a predetermined count for resetting said first counter and advancing said second counter, first step wave generating means connected to said counter output leads of said first counter for horizontally deflecting said electron beam in accordance with each advance of said first counter, second step wave generating means connected to said counter output leads of said second counter for vertically deflecting said electron beam in accordance with each advance of siad second counter, and means for connecting said counter output leads of said first and second counters to said plurality of input terminals.

References Cited by the Examiner

UNITED STATES PATENTS

| | | | |
|---|---|---|---|
| 2,219,188 | 10/40 | Kuehni | 324—121 X |
| 2,660,676 | 11/53 | Doba et al. | 324—57 |
| 2,834,005 | 5/58 | Ketchledge | 315—8.5 X |
| 2,840,637 | 6/58 | McNaney et al. | 315—8.5 X |
| 2,879,842 | 3/59 | McClure et al. | 324—73 X |
| 2,902,644 | 9/59 | McDonald | 324—88 |
| 2,902,684 | 9/59 | Mork | 315—8.5 X |
| 3,017,624 | 1/62 | Diechert | 340—324 |

FOREIGN PATENTS 830,804   3/60   Great Britain.

WALTER L. CARLSON, *Primary Examiner.*

LLOYD McCOLLUM, *Examiner.*